United States Patent
McCann et al.

(10) Patent No.: US 12,420,820 B2
(45) Date of Patent: Sep. 23, 2025

(54) VEHICLE SYSTEMS AND METHODS FOR MONITORING AND DETERMINING LOCATIONS OF EXTERNAL OBJECTS

(71) Applicant: GM GLOBAL TECHNOLOGY OPERATIONS LLC, Detroit, MI (US)

(72) Inventors: Morgan Lee McCann, Royal Oak, MI (US); Toure Lee, Pontiac, MI (US); Shihchye Allen Lin, Orlando, FL (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 311 days.

(21) Appl. No.: 18/172,760

(22) Filed: Feb. 22, 2023

(65) Prior Publication Data
US 2024/0278798 A1    Aug. 22, 2024

(51) Int. Cl.
*B60W 50/14*    (2020.01)
*G01S 17/89*    (2020.01)

(52) U.S. Cl.
CPC ....... *B60W 50/14* (2013.01); *B60W 2050/146* (2013.01); *B60W 2420/408* (2024.01); *B60W 2554/4041* (2020.02); *B60W 2554/4049* (2020.02)

(58) Field of Classification Search
CPC ........... B60W 50/14; B60W 2050/146; B60W 2420/408; B60W 2554/4041; B60W 2554/4049; G01C 21/367; G01C 21/005; G01C 21/3415; G01C 21/3694; G01C 21/3841; G01S 17/89
USPC .......................................................... 701/1
See application file for complete search history.

(56) References Cited

U.S. PATENT DOCUMENTS

| | | | |
|---|---|---|---|
| 11,618,381 B2 * | 4/2023 | Ham ...................... | G08G 1/167 340/435 |
| 11,753,029 B1 * | 9/2023 | Gregory ................ | B60W 50/14 701/301 |
| 2004/0155963 A1 * | 8/2004 | Kondo ............. | G08B 13/19647 348/180 |
| 2017/0101056 A1 * | 4/2017 | Park ....................... | G08G 1/162 |
| 2018/0308293 A1 * | 10/2018 | DeCia .................... | H04N 7/181 |

(Continued)

FOREIGN PATENT DOCUMENTS

EP    4043833 A1 *   8/2022   ............... G08G 5/54

*Primary Examiner* — Jelani A Smith
*Assistant Examiner* — George A Alcorn, III
(74) *Attorney, Agent, or Firm* — Ingrassia Fisher & Lorenz, LLP

(57) ABSTRACT

Vehicles and related systems and methods are provided for monitoring a vicinity of a vehicle. One method involves identifying, using an onboard sensor system, an object within a field of view of the sensor system, identifying a current geographic location of the vehicle using an onboard positioning system, determining an estimated geographic location of the detected object based at least in part on the current geographic location of the vehicle and the position of the detected object within the field of view of the sensor system, obtaining navigational map data for a region encompassing the current geographic location of the vehicle and the estimated geographic location of the detected object, and automatically providing a user notification. The user notification includes a navigational map of the region including a graphical indication of the detected object overlying the navigational map data at the estimated geographic location on the navigational map.

20 Claims, 5 Drawing Sheets

(56) References Cited

U.S. PATENT DOCUMENTS

| | | | |
|---|---|---|---|
| 2019/0051182 A1* | 2/2019 | Pandurangarao | G08G 1/096741 |
| 2020/0401825 A1* | 12/2020 | Ohkado | G06T 7/70 |
| 2021/0156705 A1* | 5/2021 | Pietryka | G06V 20/593 |
| 2022/0102972 A1* | 3/2022 | Tan | G06F 1/3206 |
| 2022/0333950 A1* | 10/2022 | Akbarzadeh | G01C 21/3804 |

* cited by examiner

VEHICLE SYSTEMS AND METHODS FOR MONITORING AND DETERMINING LOCATIONS OF EXTERNAL OBJECTS

INTRODUCTION

The technical field generally relates to vehicle systems and more particularly relates to facilitating users locating and monitoring detected objects in relation to a vehicle.

Many modern vehicles are capable of sensing their environment during operation using sensing devices such as radar, lidar, image sensors, and the like. Accordingly, it is desirable to maximize utilization of equipped sensing devices to enhance safety and improve user experiences. Other desirable features and characteristics of the present invention will become apparent from the subsequent detailed description and the appended claims, taken in conjunction with the accompanying drawings and the foregoing introduction.

SUMMARY

Apparatus for a vehicle and related methods for monitoring a vicinity of a vehicle for presence of external objects are provided. One method involves identifying, using a sensor system onboard the vehicle, a detected object at a position within a field of view of the sensor system, identifying a current geographic location of the vehicle using a positioning system onboard the vehicle, determining an estimated geographic location of the detected object based at least in part on the current geographic location of the vehicle and the position of the detected object within the field of view of the sensor system, obtaining a navigational map data for a region encompassing the current geographic location of the vehicle and the estimated geographic location of the detected object, and in response to the detected object, automatically providing a user notification comprising a navigational map of the region including a graphical indication of the detected object overlying the navigational map data at the estimated geographic location on the navigational map.

In one aspect, the method identifies an object type classification assigned to the detected object, wherein the graphical indication of the detected object is an icon associated with the object type classification. In another aspect, the sensor system includes a far infrared (FIR) sensing system configurable to identify the detected object when the vehicle is in a standby mode. In another aspect, the method verifies a characteristic associated with a battery onboard the vehicle satisfies an enablement criterion prior to operating the sensor system to identify the detected object when the vehicle is in a standby mode. In another aspect, automatically providing the user notification includes automatically displaying the navigational map on a display device onboard the vehicle. In another aspect, automatically providing the user notification involves automatically pushing the user notification to an electronic device over a network via a telematics system onboard the vehicle, wherein the electronic device is configurable to display the navigational map.

In yet another aspect, the method identifies an updated position of the detected object within the field of view of the sensor system in response to movement of the detected object, determines an updated geographic location of the detected object based at least in part on the current geographic location of the vehicle and the updated position of the detected object within the field of view of the sensor system, and dynamically updates a depicted position of the graphical indication of the detected object overlying the navigational map data to reflect the updated geographic location on the navigational map. In another aspect, identifying the detected object involves receiving an estimated distance to the detected object and an estimated orientation of the detected object and determining the estimated geographic location of the detected object involves calculating the estimated geographic location based at least in part on the estimated distance from the current geographic location of the vehicle in the estimated orientation.

In another aspect, a non-transitory computer-readable medium is provided that has executable instructions stored thereon that, when executed by a processor, cause the processor to identify, using a sensor system onboard a vehicle, a detected object at a position within a field of view of the sensor system, identify a current geographic location of the vehicle using a positioning system onboard the vehicle, determine an estimated geographic location of the detected object based at least in part on the current geographic location of the vehicle and the position of the detected object within the field of view of the sensor system, obtain navigational map data for a region encompassing the current geographic location of the vehicle and the estimated geographic location of the detected object, and in response to the detected object, automatically provide a user notification comprising a navigational map of the region including a graphical indication of the detected object overlying the navigational map data at the estimated geographic location on the navigational map.

In one aspect, the instructions cause the processor to identify an object type classification assigned to the detected object, wherein the graphical indication of the detected object comprises an icon associated with the object type classification. In another aspect, the sensor system is a far infrared (FIR) sensing system configurable to identify the detected object when the vehicle is in a standby mode. In another aspect, the instructions cause the processor to verify a characteristic associated with a battery onboard the vehicle satisfies an enablement criterion prior to operating the sensor system to identify the detected object when the vehicle is in a standby mode. In yet another aspect, the instructions cause the processor to automatically display the navigational map on a display device onboard the vehicle. In another aspect, the instructions cause the processor to automatically push the user notification to an electronic device over a network via a telematics system onboard the vehicle, wherein the electronic device is configurable to display the navigational map. In another aspect, the instructions cause the processor to identify an updated position of the detected object within the field of view of the sensor system in response to movement of the detected object, determine an updated geographic location of the detected object based at least in part on the current geographic location of the vehicle and the updated position of the detected object within the field of view of the sensor system, and dynamically update a depicted position of the graphical indication of the detected object overlying the navigational map data to the updated geographic location on the navigational map. In yet another aspect, the instructions cause the processor to identify an estimated distance to the detected object and an estimated orientation of the detected object and calculate the estimated geographic location based at least in part on the estimated distance from the current geographic location of the vehicle in the estimated orientation.

An apparatus for a vehicle is provided that includes a sensor system to detect an object at a position within a field of view associated with the sensor system, a positioning system to provide a current geographic location of the vehicle, an output interface, and a controller coupled to the sensor system, the positioning system, and the output interface that, by a processor, determines an estimated geographic location of the object based at least in part on the current geographic location of the vehicle and the position of the object within the field of view of the sensor system, obtains navigational map data for a region encompassing the current geographic location of the vehicle and the estimated geographic location of the object, and automatically provides, via the output interface, a user notification comprising a navigational map of the region including a graphical indication of the object overlying the navigational map data at the estimated geographic location on the navigational map in response to the sensor system detecting the object.

In one aspect, the sensor system is a far infrared (FIR) sensing system. In another aspect, the output interface is a telematics system configurable to transmit the user notification to an electronic device over a network, wherein the electronic device is configurable to display the navigational map. In another aspect, the vehicle includes a display device onboard the vehicle, wherein the output interface is coupled between the controller and the display device to provide the user notification to the display device, wherein the display device is configurable to display the navigational map.

BRIEF DESCRIPTION OF THE DRAWINGS

The exemplary aspects will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
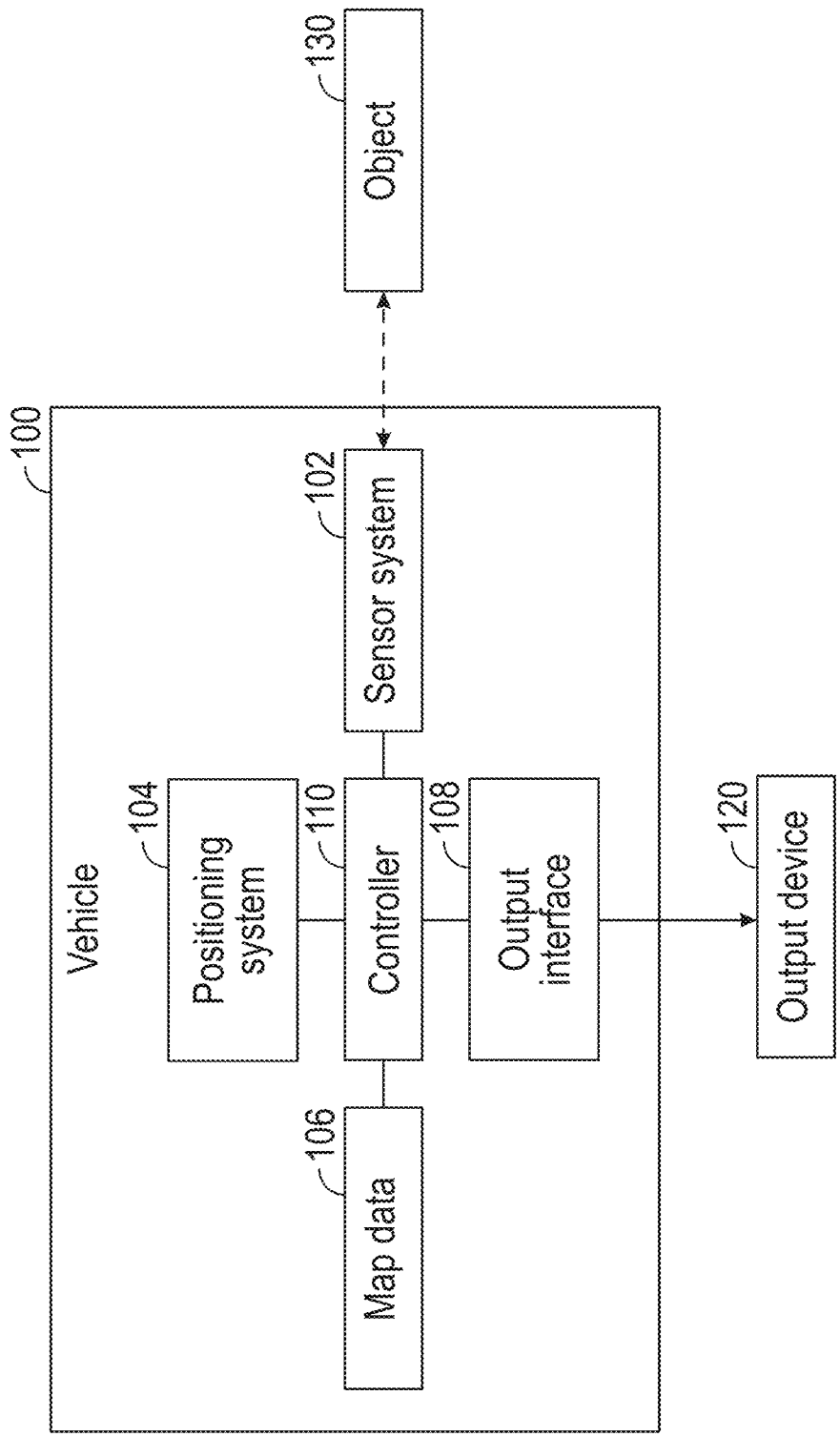
FIG. 1 is a block diagram illustrating a vehicle in accordance with various implementations.

FIG. 1 depicts an exemplary vehicle 100 that includes a sensor system 102 capable of detecting the presence of an external object 130 in a vicinity of the vehicle 100. The illustrated vehicle 100 includes, without limitation, the sensor system 102, a positioning system 104, a navigational map data source 106, and an output interface 108 communicatively coupled to a controller 110 that is configurable to support the subject matter described herein. In exemplary implementations, the vehicle 100 is realized as an automotive vehicle, such as a passenger car, a sport utility vehicles (SUV), a pickup truck, or the like, but it should be appreciated that the subject matter described herein is not limited to automotive vehicles, and can be implemented in an equivalent manner in the context of any other vehicle including motorcycles, trucks, recreational vehicles (RVs), marine vessels, aircraft, and the like. It should be appreciated that FIG. 1 depicts a simplified representation of a vehicle 100 for purposes of explanation and is not intended to be limiting in any respect.

The sensor system 102 generally represents the combination of one or more sensing devices configured to sense or otherwise obtain data indicative of an environment in a vicinity of the vehicle 100 within a field of view associated with the sensor system 102 along with the corresponding software, firmware, hardware, processing logic and/or the like that is configured to synthesize and process the sensor data from the sensing device(s) to detect the presence of an object 130 within the field of view of the sensing device(s). In some implementations, the sensor system 102 is also configurable to classify the object 130 as a particular object type and identify or otherwise determine the relative position of the object 130 in relation to the vehicle 100. In this regard, in exemplary implementations, the sensor system 102 is realized as a far infrared (FIR) sensing system that uses FIR to detect the presence of the object 130 and estimates or otherwise triangulates the relative position of the object 130 in relation to the vehicle 100 (or location of the FIR sensing device(s)) based on the FIR sensor data. That said, in other implementations, the sensor system 102 may include other sensing devices and/or incorporate information from multiple sensing devices (e.g., to improve accuracy or reliability of the object detection and classification), including but not limited to cameras, lidars, radars, and/or any number of other types of sensors. Moreover, in some implementations, the sensor system 102 may provide the captured sensor data directly to the controller 110, where the controller 110 is configurable to classify the object 130 as a particular object type and identify or otherwise determine the relative position of the object 130 in relation to the vehicle 100 based on sensor data provided by the sensor system 102.

The positioning system 104 generally represents the combination of hardware, software, firmware, processing logic and/or other components associated with the vehicle 100 that is configured to identify or otherwise determine the current geographic location of the vehicle 100. For example, in an exemplary implementation, the positioning system 104 is realized as a global positioning system (GPS) receiver system that is configured to output or otherwise provide latitude and longitude coordinates or other indicia of the current geographic location of the vehicle 100 substantially in real-time.

The navigational map data source 106 generally represents a data storage element (or memory) or other component associated with the vehicle 100 that is capable of providing navigational map data to the controller 110. The navigational map data may include one or more different individual layers, including, but not limited to, terrain data or other topographic data, elevation data, hydrography data, boundaries data, land use area data, satellite image data, geopolitical data, roadway data, and/or the like, which may be georeferenced and aligned to each other and merged together or stacked to create one navigation map data set. In practice, the navigation map data could be provided by any number of different third party suppliers or providers, or include or otherwise incorporate any number of different software applications or services provided by any number of different third party suppliers or providers, which could be accessed locally in data storage or another navigational map data source 106 at the vehicle 100 or remotely via a communications network (e.g., via a remote server or other cloud-based system), in any sort of format or protocol. Accordingly, the subject matter described herein is not limited to any particular provider, type or configuration for the navigational map data source 106 or the navigational map data provided to the controller 110. In this regard, although FIG. 1 depicts the navigational map data source 106 as being associated with or otherwise located onboard the vehicle 100, in practice, the navigational map data source 106 may be separate and distinct from the vehicle 100 and/or remotely located, where the navigational map data is retrieved or otherwise obtained by the controller 110 over a suitable communications network.

In exemplary implementations, the controller 110 includes at least one processor and a non-transitory computer readable storage device or media. The processor can be any custom made or commercially available processor, a central processing unit (CPU), a graphics processing unit (GPU), an auxiliary processor among several processors associated with the controller 110, a semiconductor-based microprocessor (in the form of a microchip or chip set), a macroprocessor, any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 110. The instructions may include one or more separate programs, each of which comprises an ordered listing of executable instructions for implementing logical functions. The instructions, when executed by the processor, cause the controller 110 to receive and/or process signals and/or data from the sensor system 102, the positioning system 104 and/or the navigational map data source 106, perform logic, calculations, methods and/or algorithms for generating user notifications, and provide the user notifications to a user on an output device 120 via an output interface 108. In this regard, the output interface 108 generally represents the combination of hardware, software, firmware, processing logic and/or other components associated with the vehicle 100 that is configured to support the controller 110 transmitting or otherwise providing one or more user notifications or alerts to a user associated with the vehicle 100 using an output device 120.

In one or more implementations, the output device 120 is realized as an electronic device associated with a vehicle owner or other user associated with the vehicle 100 that is separate and distinct from the vehicle 100 but communicatively coupled to the controller 110, such as, for example, a smartphone, a desktop computer, a mobile computer (e.g., a tablet computer, a laptop computer, or a netbook computer), a video game device, a digital media player, a piece of home entertainment equipment, a digital camera or video camera, a wearable computing device (e.g., smart watch, smart glasses, smart clothing), or the like. In such implementations, the output device 120 is realized as a computer-implemented or computer-based device having the hardware, software, firmware, and/or processing logic needed to carry out the various techniques and methodologies described herein using any suitable hardware platform realized in any common form factor, while the output interface 108 generally represents a telematics system or other communication system configured to wirelessly communicate information to and from the output device 120 over a communication network, such as but not limited to, a network of other vehicles ("V2V" communication), an infrastructure network ("V2I" communication), a wireless local area network (WLAN), a personal area network (PAN), a cellular network, a dedicated short-range communications (DSRC) channel, and/or the like.

That said, in other implementations, the output device 120 is realized as an electronic display device that is located onboard the vehicle 100 or otherwise associated with another system onboard the vehicle 100, such as, for example, any sort of infotainment module, navigation head unit, or another similar or suitable unit that resides onboard the vehicle 100, and which may be integrated into a dashboard or other console within a passenger compartment of the vehicle 100. In such implementations, the output interface 108 may be realized as a bus interface or similar communications interface that includes the hardware, software, firmware, processing logic and/or other components for communicating to/from the output device 120, such as, for example, a processor, microcontroller or other electronics that supports communications over a controller area network (CAN) bus or other wired vehicle network.

Figure 2:
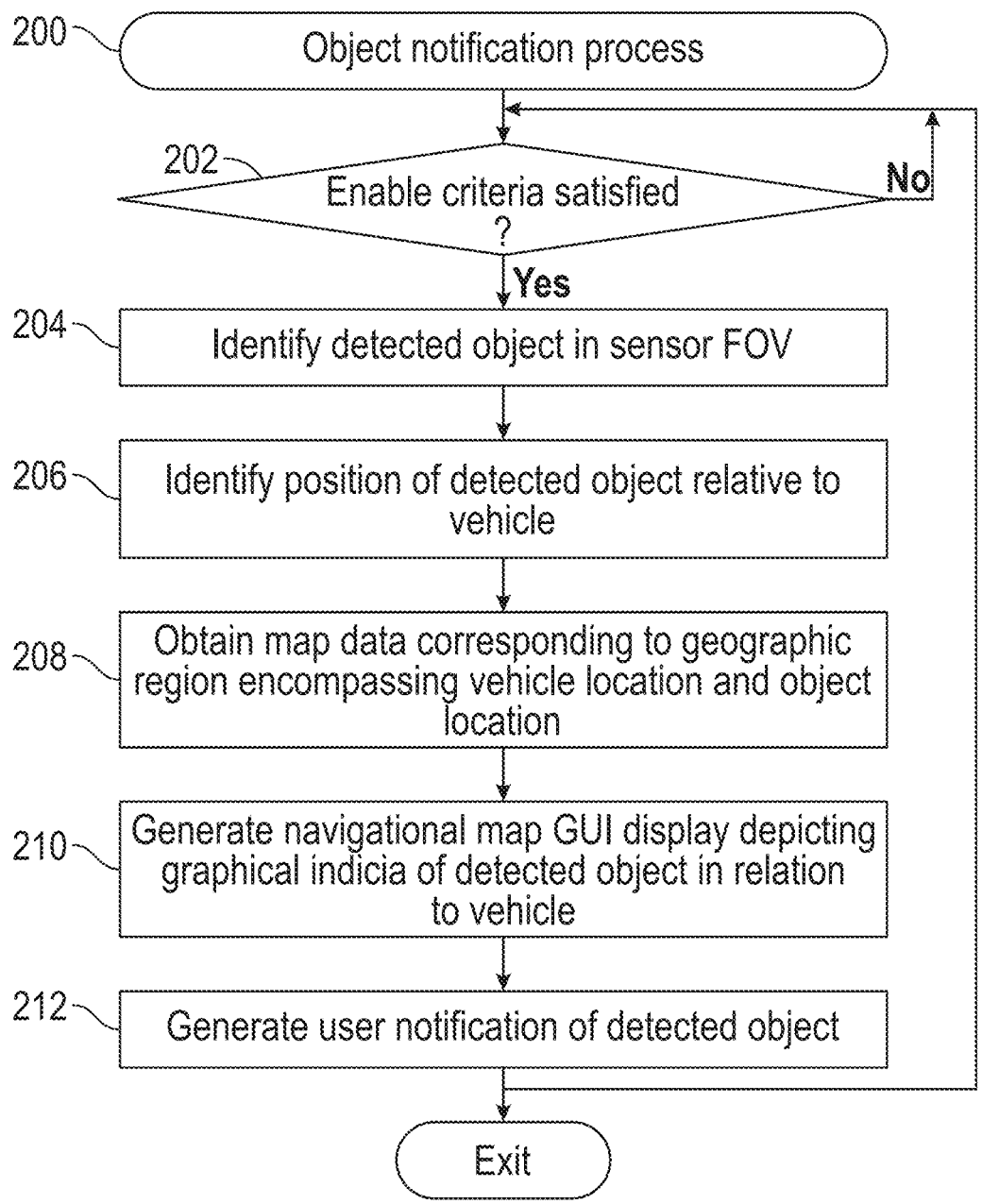
FIG. 2 depicts a flow diagram of a process suitable for implementation in connection with a vehicle according to one or more implementations described herein.

FIG. 2 depicts an exemplary implementation of an object notification process 200 suitable for implementation by a controller associated with a vehicle to provide notification to a user of a detected object in relation to the vehicle. For illustrative purposes, the following description may refer to elements mentioned above in connection with FIG. 1. While portions of the object notification process 200 may be performed by different elements of a vehicle system, for purposes of explanation, the subject matter may be primarily described herein in the context of the object notification process 200 being primarily performed by the controller 110.

In exemplary implementations, the object notification process 200 is performed while the vehicle is in a standby mode or is otherwise not being operated for propulsion. For example, the object notification process 200 may be manually or automatically enabled or initiated when the vehicle is in park (or parked) and an ignition switch is in an off position that turns off or otherwise disables propulsive operation and may otherwise configure the onboard systems to be powered off or otherwise enter a standby mode. The object notification process 200 initializes or otherwise begins at 202 by verifying or otherwise confirming one or more enablement criteria associated with the object notification process 200 are satisfied. In this regard, the controller 110 may communicate with one or more of a vehicle control module (VCM), a battery control module (BCM), an engine control module (ECM), an electronic control unit (ECU), and/or the like associated with the vehicle 100 to verify the current state or status of the vehicle 100 satisfies one or more criteria or thresholds required for enabling the object notification process 200. For example, the controller 110 may verify that the current state of charge (SOC), the current state of health (SOH), the current voltage level and/or another characteristic associated with one or more batteries onboard the vehicle 100 is greater than a respective enablement threshold to ensure that the vehicle 100 will be operable for propulsion and that the operation of the sensor system 102 in connection with the object notification process 200 will not degrade the current state of the battery below a particular threshold level or state required to ensure operation of the vehicle 100. When the enablement criteria are satisfied for initiating the object notification process 200, the controller 110 commands, signals or otherwise instructs the sensor system 102 to enable or otherwise power on the sensor device(s) and other components of the sensor system 102 to provide indicia of any objects detected in the vicinity of the vehicle 100 within the field of view associated with the sensor device(s), for example, by transitioning the sensor system 102 from a standby mode into a normal operating mode associated with the sensor system 102. In a similar manner, the controller 110 may command, signal or otherwise instruct the positioning system 104 to enable or otherwise power on the sensor device(s) and other components of the positioning system 104 to provide indicia of current geographic location of the vehicle 100 (e.g., by transitioning the positioning system 104 from a standby mode into a normal operating mode).

The object notification process 200 continues by receiving or otherwise obtaining indicia of a detected object in the vicinity of the vehicle at 204 and identifying, estimating or otherwise determining the position of the detected object in relation to the vehicle at 206. For example, the sensor system 102 may output or otherwise provide, to the controller 110, indication of the classified object type assigned to the detected object 130 along with indicia of the relative position of the object with respect to the vehicle 100, such as, for example, an estimated distance between the vehicle 100 and the detected object 130 and an angle, heading or orientation of the detected object 130 relative to the line of sight or other reference axis associated with the sensor device(s). The controller 110 may identify or otherwise obtain the current geographic location of the vehicle 100 from the positioning system 104 and then calculate or otherwise determine an estimated geographic location of the detected object 130 based on the distance and angle between the vehicle 100 and the detected object 130 using triangulation or another suitable technique, for example, to derive estimated latitude and longitude coordinates of the detected object 130 based on the current latitude and longitude coordinates of the vehicle 100 and the current heading or orientation of the vehicle 100 provided by the positioning system 104.

In exemplary implementations, the object notification process 200 continues by retrieving or otherwise obtaining navigational map data corresponding to a geographic region encompassing both the current vehicle location and the estimated geographic location of the detected object at 208 and constructing or otherwise generating a navigational map graphical user interface (GUI) display that depicts a graphical indication of the detected object in relation to the vehicle at 210. In this regard, using the respective sets of latitude and longitude coordinates associated with the current vehicle location and the estimated geographic location of the detected object 130, the controller 110 may query or otherwise retrieve a respective subset of the navigational map data from the navigational map data source 106 that corresponds to a geographic region encompassing both sets of latitude and longitude coordinates. To generate the navigational map GUI display, in exemplary implementations, the controller 110 renders or otherwise generates one or more lower layers that provide a background of the navigational map GUI display using the retrieved navigational map data and then renders or otherwise generates graphical indicia of the detected object 130 and the host vehicle 100 in an overlying (or upper) layer of the navigational map GUI display at their respective geographic locations corresponding to their respective latitude and longitude coordinates in relation to the depicted background. In exemplary implementations, the controller 110 utilizes the indication of the object type classification assigned to the detected object 130 by the sensor system 102 to select or otherwise identify a corresponding graphical icon or other graphical representation of the assigned object type and then renders or otherwise generates the selected object icon on the navigational map GUI display at the respective geographic location associated with the detected object 130. In a similar manner, the controller 110 may select or otherwise identify a graphical icon or other graphical representation of the host vehicle 100 and then render or otherwise generate the selected vehicle icon on the navigational map GUI display at the respective geographic location associated with the vehicle 100.

In exemplary implementations, the object notification process 200 automatically generates or otherwise provides one or more user notifications that an object was detected in the vicinity of the vehicle at 212. For example, the controller 110 may automatically push or otherwise transmit one or more notifications to the output device 120 via the output interface 108 to notify a user of the presence of a detected object. Depending on the implementation, the controller 110 may provide commands, signals or other instructions that cause the output device 120 to generate one or more auditory, visual and/or haptic notifications that alert the user to the presence of the detected object 130. In some implementations, the user notification may include a hyperlink or other selectable GUI element that, when selected by a user, cause the output device 120 to automatically display or otherwise present the navigational map GUI display generated by the controller 110 that includes graphical indicia of the detected object 130 in relation to the vehicle 100. For example, the controller 110 may automatically transmit a push notification or similar message to a user's mobile device that includes a selectable GUI element that, when selected, causes the user's mobile device to display or otherwise present the navigational map GUI display generated by the controller 110. In other implementations, selection of the GUI element may initiate establishment of a communications session between the controller 110 and the output device 120 that supports substantially real-time video streaming of a navigational map GUI display generated by the controller 110 that dynamically updates in response to changes to the position of the detected object 130 in relation to the vehicle 100. In this regard, in the illustrated implementation, the loop defined by 202, 204, 206, 208, 210 and 212 continually repeats while enablement criteria remain satisfied to dynamically determine the updated geographic location or position of the detected object 130 in relation to the vehicle 100 in response to movement of the detected object 130 and correspondingly update the position of the graphical indication of the detected object 130 on the navigational map GUI display substantially in real-time to reflect the currently detected position of the object 130 in relation to the vehicle 100. Once the enablement criteria are no longer satisfied (e.g., the current SOC of the vehicle battery is less than or equal to a threshold minimum SOC), the object notification process 200 automatically terminates. In connection with terminating the object notification process 200, the controller 110 may automatically disable, power off or otherwise deactivate the sensor system 102 (e.g., to conserve the vehicle battery).

Figure 3:
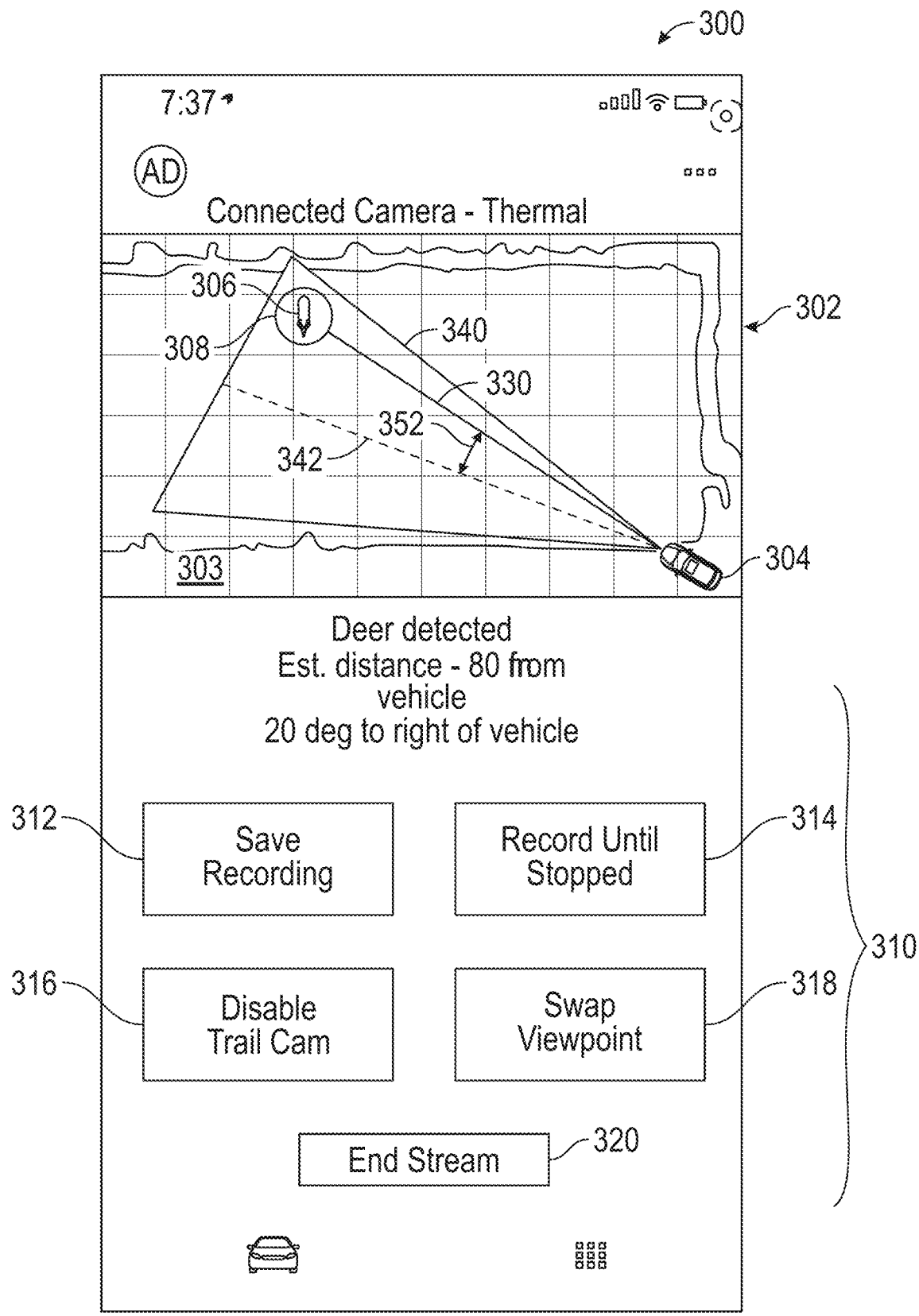
FIGS. 3-5 depict exemplary graphical user interface (GUI) displays suitable for presentation to a user in accordance with one or more implementations.

FIG. 3 depicts an exemplary detected object notification GUI display 300 that may be generated or otherwise provided on the output device 120 in connection with an implementation of the object notification process 200. Referring to FIG. 3 with reference to FIGS. 1-2, the detected object notification GUI display 300 includes a two-dimensional, top-down navigational map GUI display 302 that includes a background graphical representation of terrain data (or terrain background 303) corresponding to a geographic region encompassing the respective geographic locations of the vehicle 100 and the detected object 130. A vehicle icon 304 or similar graphical representation of the vehicle 100 is depicted overlying the terrain background 303 at a position on the navigational map GUI display 302 corresponding to the current real-world geographic location of the vehicle 100 in relation to the underlying terrain depicted as part of the terrain background 303.

Similarly, an icon 306 or similar graphical representation of the detected object 130 is depicted overlying the terrain background 303 at a position on the navigational map GUI display 302 in relation to the underlying terrain depicted as part of the terrain background 303 that corresponds to the current estimated real-world geographic location of the detected object 130 in relation to the current geographic location of the vehicle 100. In this regard, FIG. 3 depicts a scenario where the sensor system 102 classified the detected object 130 as a deer, resulting in the controller 110 rendering a deer icon 306 or similar image of a deer overlying the terrain background 303. That said, in other implementations, the icon 306 may be realized as a graphical representation of the subset of sensor data corresponding to the detected object 130 (e.g., a rendering of the sensor data for the object 130 overlying a background navigational map data layer). Additionally, in the illustrated implementation, the controller 110 may generated or otherwise render a graphical feature 308, such as a circle encompassing the deer icon 306, to visually emphasize or otherwise notify the user of the detected object 130 being depicted on the navigational map GUI display 302. As described above, in one or more implementations, the navigational map GUI display 302 is rendered, conveyed or otherwise presented as a video stream, where the depicted position of the deer icon 306 with respect to the vehicle icon 304 and the underlying terrain background 303 dynamically updates substantially in real-time as the deer moves in relation to the vehicle 100.

For example, referring to FIG. 3 with reference to FIGS. 1-2, in an exemplary implementation, the sensor system 102 is realized as an FIR sensor system that is configurable to output or otherwise provide indicia of the detected object 130 including identification of the object type classification assigned to the detected object 130 (e.g., deer), an estimated distance 330 between the sensor system 102 and/or the vehicle 100, and an estimated angle or orientation 332 of the detected object 130 relative to a central or reference axis 342 associated with the field of view 340 of the FIR sensing device. The controller 110 obtains the latitude and longitude coordinates defining the current geographic location of the vehicle 100 from the onboard positioning system 104 and then calculates the estimated latitude and longitude coordinates for the estimated geographic location of the detected object 130 based on the estimated distance 330 and orientation 332 of the detected object 130 relative to the current vehicle location that was received from the FIR sensor system 102.

The controller 110 utilizes the current geographic location of the vehicle 100 and the estimated geographic location of the detected object 130 to identify a geographic area or region to be depicted that encompasses both the current geographic location of the vehicle 100 and the estimated geographic location of the detected object 130 and then queries or otherwise retrieves navigational map data for rendering a terrain background 303 including the geographic region encompassing both the vehicle 100 and the detected object 130 from the appropriate navigational map data source 106. The controller 110 then generates or otherwise creates the navigational map GUI display 302 that includes a vehicle icon 304 or other graphical representation of the vehicle 100 overlying the graphical representation of the terrain background 303 at a position that reflects the real-world geographic location of the vehicle 100. The graphical representation 306 of the detected object 130 (e.g., a deer icon or other graphical representation of a deer, a graphical representation of the FIR sensor data associated with the deer, and/or the like) is rendered or otherwise displayed by the controller 110 at a depicted position overlying the terrain background 303 on the navigational map GUI display 302 that corresponds to the estimated latitude and longitude coordinates of the detected object 130. The graphical representation 306 of the detected object 130 (e.g., a deer icon or other graphical representation of a deer, a graphical representation of the FIR sensor data associated with the deer, and/or the like) is rendered or otherwise displayed by the controller 110 at a depicted position overlying the terrain background 303 on the navigational map GUI display 302 that corresponds to the estimated latitude and longitude coordinates of the detected object 130.

Thereafter, in response to movement of the deer within the field of view 340 associated with the FIR sensor system 102, the FIR sensor system 102 may automatically output or otherwise provide an updated distance and orientation of the deer identifying the updated position of the deer to the controller 110, which, in response, dynamically determines or otherwise identifies an updated geographic location of the deer based on the updated position of the deer within the field of view 340 in relation to the current geographic location of the vehicle 100 in a similar manner as described above. The controller 110 automatically and dynamically updates the depicted position of the deer icon 306 or other graphical indicia of the detected object 130 to reflect the updated geographic location substantially in real-time, such that the position of the deer icon 306 may move within the navigational map GUI display 302 in a manner that reflects real-world movement of the deer with respect to the vehicle 100 substantially in real-time.

Figure 4:
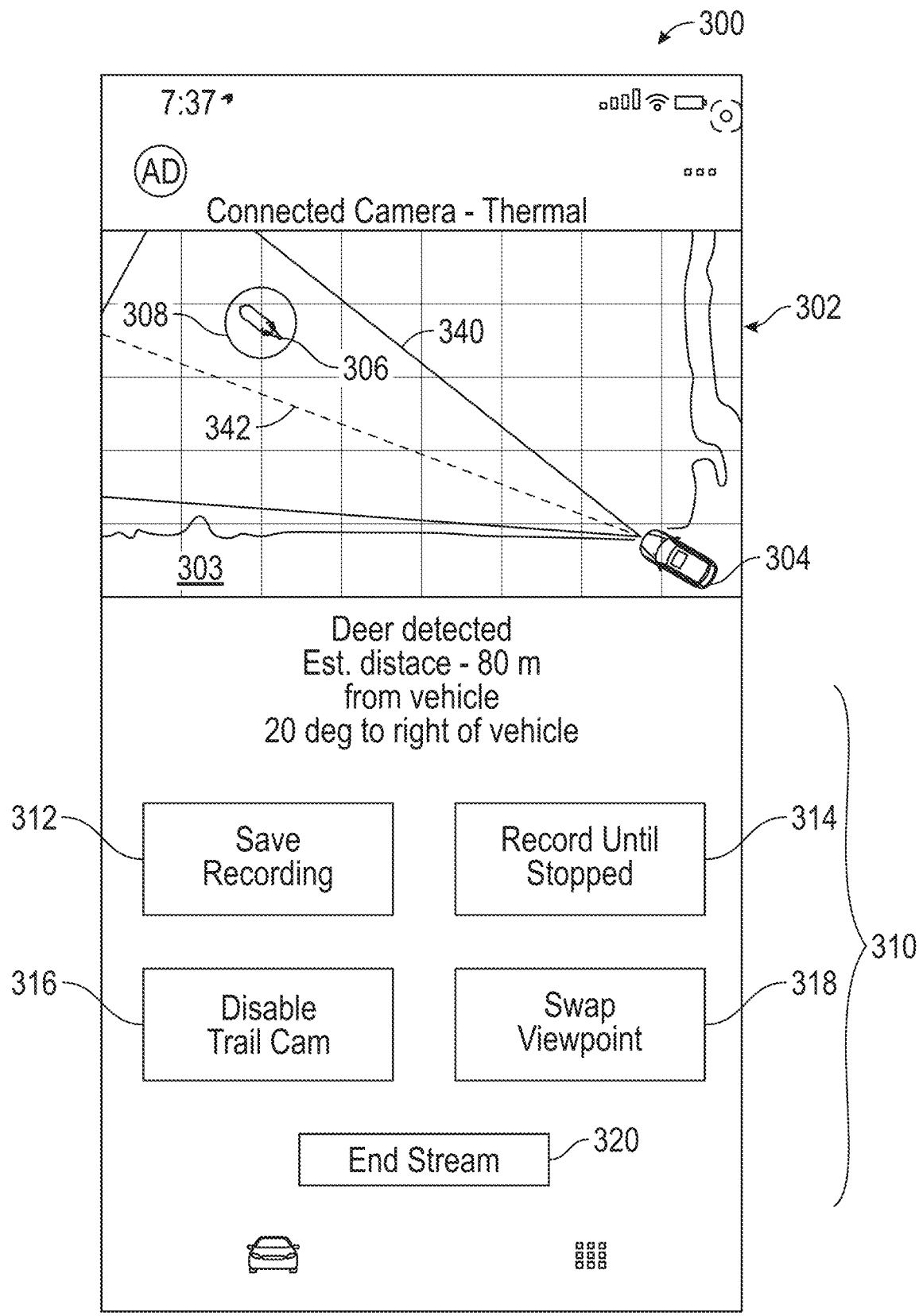

In one or more implementations, the controller 110 automatically and dynamically updates the orientation of the deer icon 306 or other graphical indicia of the detected object 130 in response to movement to reflect the direction in which the detected object 130 is moving in relation to the vehicle 100 and/or its preceding position, as shown in FIG. 4. For example, the FIR sensor system 102 and/or the controller 110 may be configurable to track the detected object 130 over successive frames of FIR sensor data to monitor the change in the position of the detected object 130 and calculate or otherwise determine a corresponding movement vector that indicates the direction in which the detected object 130 is moving and the rate at which the detected object 130 is moving in that direction. In this regard, in addition to rotating the icon 306 or otherwise modifying the depiction of the detected object 130, some implementations could provide graphical indicia of the direction and/or rate of movement (e.g., an arrow emanating from the icon 306 with an orientation corresponding to the movement vector and a length of the arrow that is proportional to the velocity, acceleration or other rate of movement of the detected object 130), thereby graphically conveying the observed movement and/or expected future position of the detected object 130.

In one or more implementations, the scale or resolution of the navigational map GUI display 302 is dynamically updated substantially in real-time in response to movement of the detected object 130 in a manner that is proportional to or otherwise corresponds to the estimated distance between the vehicle 100 and the detected object 130. For example, based on the estimated distance to the detected object 130, the controller 110 may initially obtain navigational map data for the background 303 with an initial resolution that corresponds to the size of the geographic area that encompasses both the vehicle 100 and the detected object 130, that is, the navigational map data may be scaled in proportion to the estimated distance to the detected object 130. Thereafter, as the detected object 130 moves closer or farther from the vehicle 100, the controller 110 obtain navigational map data with a different resolution to effectively zoom in (when the object moves closer to the vehicle) or zoom out (when the object moves away from the vehicle) as the geographic area encompassing both the vehicle 100 and the detected object 130 expands or contracts, thereby autoscaling the navigational map GUI display proportionally to the distance between the detected object 130 and the vehicle 100 to fit the screen or area of the display. In this regard, in one or more implementations, the navigational map GUI display includes grid lines to illustrate or otherwise convey the distance to the detected object 130 in fixed increments (e.g., every 10 feet, etc.).

Referring again to FIG. 3, the exemplary detected object notification GUI display 300 also includes a user notification region 310 that includes graphical indicia of the object type or classification assigned to the detected object 130 (e.g., deer detected), the estimated distance between the detected object 130 and the vehicle 100 (e.g., 100 meters from vehicle), and the orientation or angle of the detected object 130 in relation to the longitudinal axis or forward line of sight of the vehicle 100 (e.g., 20 degrees to the right of vehicle). The illustrated user notification region 310 also includes one or more buttons or similar selectable GUI elements that are manipulable by a user, including, for example, a button 312 to save a recorded video stream of the navigational map GUI display 302, a button 314 to configure the controller 110 to continue recording the video stream of the navigational map GUI display 302 until manually stopped by the user, a button 316 to turn off or otherwise disable the sensor system 102 and/or the object notification process 200, a button 318 to swap the viewpoint depicted in the navigational map GUI display 302, and a button 320 to terminate or otherwise end the video stream of the navigational map GUI display 302.

Figure 5:
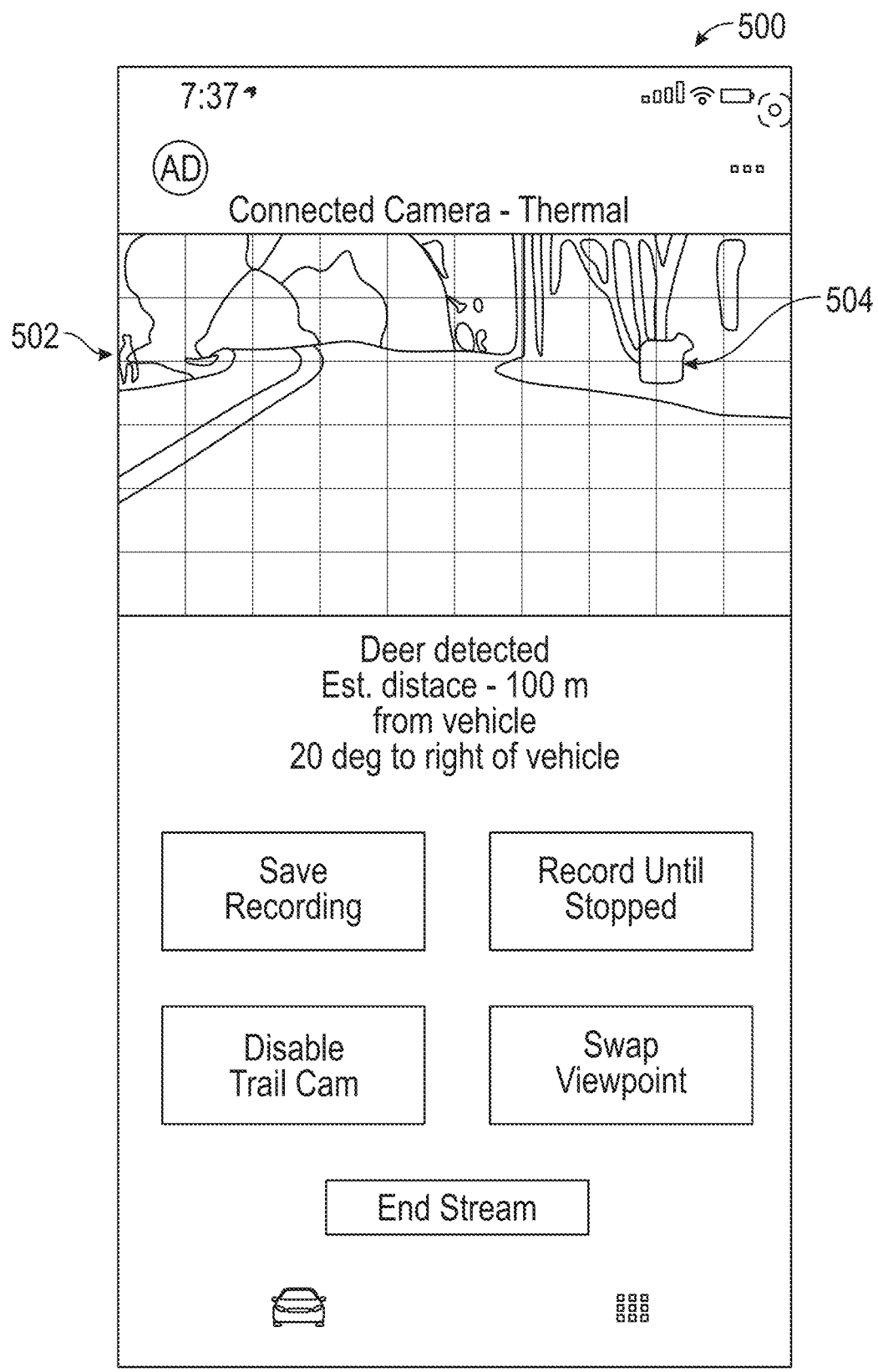

Referring to FIG. 5, in response to selection of the button 318 to swap the viewpoint depicted in by the navigational map GUI display 302, the controller 110 may automatically generate an updated detected object notification GUI display 500 that includes a perspective view GUI display 502 of the geographic region corresponding to the field of view of the sensor system 102 that encompasses the geographic position of the detected object 130. In some implementations, the controller 110 may utilize navigational map data obtained from the navigational map data source 106 to render or otherwise provided a three-dimensional view of the forward-looking geographic region that includes detected object 130. That said, in other implementations, the controller 110 may utilize the sensor data captured for the forward-looking field of view of the sensor system 102 to generate or otherwise render the background of the perspective view GUI display 502 while depicting a graphical indication 504 of the detected object 130 overlying the background of the perspective view GUI display 502. The graphical indication 504 of the detected object 130 may be realized as a graphical representation of the subset of sensor data corresponding to the detected object 130 (e.g., a monochromatic rendering of FIR sensor data for the object 130). In some implementations, the perspective view GUI display 502 is realized as an augmented reality display, where the graphical indication 504 of the detected object 130 is realized as an icon or other image corresponding to the object type classification assigned to the detected object 130 that overlies the sensor data captured for the field of view of the sensor system 102. Similar to the navigational map GUI display 302, the perspective view GUI display 502 may be realized as a video stream that dynamically updates as the detected object 130 moves in relation to the vehicle 100.

It should be appreciated that the GUI displays depicted in FIGS. 3-4 are merely exemplary and not intended to be limiting. Moreover, it should be noted that, in practice, one or more aspects of the object notification process 200 may be configurable by a user to provide corresponding navigational map GUI displays and user notifications or alerts in accordance with a user-specific configuration. For example, a user may interact with a software application executing by or on the controller 110 or the output device 120 to select or otherwise configure the type and/or number of user notifications to be generated by the object notification process 200 (e.g., auditory alerts, haptic feedback, push notifications, text messages, e-mail notifications and/or the like). A user may also configure one or more aspects of the navigational map GUI display to be generated in connection with the object notification process 200 including, but not limited to, identification or selection of the desired map data layers to be utilized to render the background of the navigational map GUI display (e.g., road or route level map data, topographic map data, satellite image data, and/or the like), the desired orientation of the navigational map GUI display (e.g., North up, heading up, and/or the like), the range or zoom of the navigational map GUI display, and/or the like.

Referring to FIGS. 1-4, the subject matter described herein utilizes an onboard sensor system and other connected sensor or camera features to provide object detection and corresponding user notifications when a vehicle is in a standby mode or otherwise not in propulsive operation. For example, an FIR sensor system or similar sensor system is capable of detecting and classifying an object in the vicinity of the vehicle, including in situations where a human or camera may be unable to identify an object (e.g., at nighttime due to low or zero ambient lighting, fog, smoke, and/or the like). The detected object classification is passed to a controller (which may be associated with a telematics system or a connected camera system of the vehicle) that is configurable to provide push notifications of the detected objects to the vehicle owner or other users associated with the vehicle in a user-configurable manner. In this regard, user notifications may be pushed or otherwise provided to a software application at a user's mobile device and/or to one or more onboard systems to provide in-vehicle notifications. In exemplary implementations, the user notifications include a navigational map GUI display that facilitates a user placing or locating the detected object in the real-world, for example, by translating the FIR sensor data into a synthetic lateral map or top view by overlaying indicia of the detected object over navigational map data. The object notification process 200 may also be configurable to provide a live video feed of the FIR sensor data or otherwise update the navigational map GUI display in real-time by dynamically updating the position of the detected object indication on the navigational map GUI display. In this manner, the subject matter facilitates a user locating and tracking the detected object in the real-world in relation to the vehicle.

Haptic or auditory feedback may also be employed to alert the user to the presence of an object in the vicinity of the vehicle, for example, by causing the driver's seat in the vehicle to vibrate, causing an auditory notification via an audio output device within a passenger compartment of the vehicle, causing the user's mobile phone to vibrate, causing an auditory notification at the user's mobile phone, and/or the like. For example, a user who is hunting or searching for wildlife can sleep in his or her car, while the object notification process operates the onboard sensor system(s) to detect and identify presence of a deer or other animal in the vicinity of the vehicle before providing haptic and/or auditory alerts to wake the user. The user may then utilize the navigational map GUI display to locate where the detected animal is at in relation to the vehicle and monitor the real-time video feed or updates provided to the navigational map GUI display to track the detected animal in real-time. In this manner, the object notification process may function like both a sentry system to improve security and a trail camera to detect and locate objects in real-time.

In some implementations, the object notification process may be implemented in a distributed manner, where the features and/or functionality of the controller may be implemented or otherwise provided at a user's mobile device or other client device that is separate from the vehicle (e.g., output device 120). In such implementations, a user may utilize a mobile application or other software on his or her to select or otherwise configure a desired mode for the object notification process from among a number of different supported operating modes (e.g., sentry mode, trail camera mode, and/or the like). In this regard, for a given operating mode, the user may utilize the mobile application to define user preferences, settings or other criteria that dictate the manner in which the object notification process generates and provides user notifications. Thereafter, the user may utilize the mobile application to enable to the object notification process, which, in turn, results in the mobile application remotely signaling, instructing or otherwise commanding the onboard sensor system and the onboard positioning system to transition from a standby mode into an operating mode that supports the object notification process. The mobile application may subsequently receive from the onboard systems (e.g., via a telematics system or other onboard communications system) indicia of the current geographic location of the vehicle and the relative position of the detected object. The mobile application may then perform the steps of determining the estimated geographic location of the detected object, obtaining navigational map data from a navigational map data source (which may be downloaded from a remote server or other system external to the vehicle in response to the object being detected), and automatically generating user notifications and corresponding navigational map GUI displays at the user's mobile device in accordance with the user's configuration, preferences and/or settings defined for the selected operating mode.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing the exemplary aspect or exemplary aspects. It should be understood that various changes can be made in the function and arrangement of elements without departing from the scope of the disclosure as set forth in the appended claims and the legal equivalents thereof.

What is claimed is:

1. A method of monitoring a vicinity of a vehicle, the method comprising: receiving a state of charge (SOC) and a state of health (SOH) of a battery system onboard the vehicle from a battery control module (BCM) when the vehicle is in a standby mode;
 determining whether the SOC and the SOH are greater than respective enablement thresholds when the vehicle is in the standby mode;
 transitioning a sensor system onboard the vehicle from a standby mode to a normal operating mode and a positioning system onboard the vehicle from a standby mode to a normal operating mode in response to a determination that the SOC and the SOH of the battery is greater than the respective enablement thresholds when the vehicle is in the standby mode;
 identifying, using the sensor system onboard the vehicle, a detected object at a position within a field of view of the sensor system when the vehicle is in standby mode;
 identifying a current geographic location of the vehicle using the positioning system onboard the vehicle when the vehicle is in the standby mode;
 determining an estimated geographic location of the detected object based at least in part on the current geographic location of the vehicle and the position of the detected object within the field of view of the sensor system when the vehicle is in the standby mode;
 obtaining a navigational map data for a region encompassing the current geographic location of the vehicle and the estimated geographic location of the detected object when the vehicle is in the standby mode; and
 in response to the detected object, automatically providing a user notification comprising a navigational map of the region including a graphical indication of the detected object overlying the navigational map data at the estimated geographic location on the navigational map and causing a driver seat of the vehicle to vibrate when the vehicle is in the standby mode;
 wherein:
  the sensor system comprises a far infrared (FIR) sensing system configurable to identify the detected object when the vehicle is in the standby mode;
  automatically providing the user notification comprises automatically pushing the user notification to an electronic device over a network via a telematics system onboard the vehicle, wherein the electronic device is configurable to display the navigational map;
  identifying the detected object comprises receiving an estimated distance to the detected object and an estimated angle of the detected object in relation to a forward line of sight of the vehicle; and
  determining the estimated geographic location of the detected object comprises calculating the estimated geographic location based at least in part on the estimated distance from the current geographic location of the vehicle in the estimated angle of the detected object in relation to the forward line of sight of the vehicle.

2. The method of claim 1, further comprising identifying an object type classification assigned to the detected object, wherein the graphical indication of the detected object comprises an icon associated with the object type classification.

3. The method of claim 1, wherein automatically providing the user notification comprises automatically displaying the navigational map on a display device onboard the vehicle.

4. The method of claim 1, further comprising:
identifying an updated position of the detected object within the field of view of the sensor system in response to movement of the detected object;
determining an updated geographic location of the detected object based at least in part on the current geographic location of the vehicle and the updated position of the detected object within the field of view of the sensor system; and
dynamically updating a depicted position of the graphical indication of the detected object overlying the navigational map data to reflect the updated geographic location on the navigational map.

5. The method of claim 1, wherein the standby mode indicates that the vehicle is in park with an ignition switch of the vehicle in an off position.

6. The method of claim 1, wherein in response to the detected object, causing the driver seat of the vehicle to vibrate with sufficient force to awaken a sleeping driver in the driver seat.

7. The method of claim 1, further comprising generating a graphical user interface (GUI) display comprising:
the user notification comprising the navigational map of the region including the graphical indication of the detected object overlying the navigational map data at the estimated geographic location on the navigational map;
a first selectable GUI element to save a recorded video stream of the navigational map;
a second selectable GUI element to stop recording the video stream;
a third selectable GUI element to disable the sensor system; and
a fourth selectable GUI element to swap a viewpoint depicted in the navigational map.

8. A non-transitory computer-readable medium comprising executable instructions that, when executed by a processor, cause the processor to:
receive a state of charge (SOC) and a state of health (SOH) of a battery system onboard the vehicle from a battery control module (BCM) when the vehicle is in a standby mode;
determine whether the SOC and the SOH are greater than respective enablement thresholds when the vehicle is in the standby mode;
transition a sensor system onboard the vehicle from a standby mode to a normal operating mode and a positioning system onboard the vehicle from a standby mode to a normal operating mode in response to a determination that the SOC and the SOH of the battery is greater than the respective enablement thresholds when the vehicle is in the standby mode;
identify, using the sensor system onboard a vehicle, a detected object at a position within a field of view of the sensor system when the vehicle is in the standby mode;
identify a current geographic location of the vehicle using the positioning system onboard the vehicle when the vehicle is in the standby mode;
determine an estimated geographic location of the detected object based at least in part on the current geographic location of the vehicle and the position of the detected object within the field of view of the sensor system when the vehicle is in the standby mode;
obtain navigational map data for a region encompassing the current geographic location of the vehicle and the estimated geographic location of the detected object when the vehicle is in the standby mode; and
in response to the detected object, automatically provide a user notification comprising a navigational map of the region including a graphical indication of the detected object overlying the navigational map data at the estimated geographic location on the navigational map and cause a driver seat of the vehicle to vibrate when the vehicle is in the standby mode;
wherein:
the sensor system comprises a far infrared (FIR) sensing system configurable to identify the detected object when the vehicle is in the standby mode;
automatically providing the user notification comprises automatically pushing the user notification to an electronic device over a network via a telematics system onboard the vehicle, wherein the electronic device is configurable to display the navigational map;
identifying the detected object comprises receiving an estimated distance to the detected object and an estimated angle of the detected object in relation to a forward line of sight of the vehicle; and
determining the estimated geographic location of the detected object comprises calculating the estimated geographic location based at least in part on the estimated distance from the current geographic location of the vehicle in the estimated angle of the detected object in relation to the forward line of sight of the vehicle.

9. The non-transitory computer-readable medium of claim 8, wherein the instructions cause the processor to identify an object type classification assigned to the detected object, wherein the graphical indication of the detected object comprises an icon associated with the object type classification.

10. The non-transitory computer-readable medium of claim 8, wherein the instructions cause the processor to automatically display the navigational map on a display device onboard the vehicle.

11. The non-transitory computer-readable medium of claim 8, wherein the instructions cause the processor to:
identify an updated position of the detected object within the field of view of the sensor system in response to movement of the detected object;
determine an updated geographic location of the detected object based at least in part on the current geographic location of the vehicle and the updated position of the detected object within the field of view of the sensor system; and
dynamically update a depicted position of the graphical indication of the detected object overlying the navigational map data to the updated geographic location on the navigational map.

12. The non-transitory computer-readable medium of claim 8, wherein the standby mode indicates that the vehicle is in park with an ignition switch of the vehicle in an off position.

13. The non-transitory computer-readable medium of claim 8, wherein in response to the detected object, cause the driver seat of the vehicle to vibrate with sufficient force to awaken a sleeping driver in the driver seat.

14. The non-transitory computer-readable medium of claim 8, wherein the instructions cause the processor to generate a graphical user interface (GUI) display comprising:
- the user notification comprising the navigational map of the region including the graphical indication of the detected object overlying the navigational map data at the estimated geographic location on the navigational map;
- a first selectable GUI element to save a recorded video stream of the navigational map;
- a second selectable GUI element to stop recording the video stream;
- a third selectable GUI element to disable the sensor system; and
- a fourth selectable GUI element to swap a viewpoint depicted in the navigational map.

15. A vehicle comprising:
- a sensor system to detect an object at a position within a field of view associated with the sensor system when the vehicle is in a standby mode;
- a positioning system to provide a current geographic location of the vehicle when the vehicle is in the standby mode;
- an output interface;
- a battery control module (BCM);
- a driver seat; and
- a controller coupled to the sensor system, the positioning system, the output interface, the BCM, and the driver seat that, by a processor:
  - receives a state of charge (SOC) and a state of health (SOH) of a battery system onboard the vehicle from the BCM when the vehicle is in a standby mode;
  - determines whether the SOC and the SOH are greater than respective enablement thresholds when the vehicle is in the standby mode;
  - transitions the sensor system from a standby mode to a normal operating mode and the positioning system from a standby mode to a normal operating mode in response to a determination that the SOC and the SOH of the battery is greater than the respective enablement thresholds when the vehicle is in the standby mode;
  - determines an estimated geographic location of the object based at least in part on the current geographic location of the vehicle and the position of the object within the field of view of the sensor system when the vehicle is in the standby mode;
  - obtains navigational map data for a region encompassing the current geographic location of the vehicle and the estimated geographic location of the object when the vehicle is in the standby mode; and
  - automatically provides, via the output interface, a user notification comprising a navigational map of the region including a graphical indication of the object overlying the navigational map data at the estimated geographic location on the navigational map and causing the driver seat to vibrate in response to the sensor system detecting the object when the vehicle is in the standby mode;
- wherein:
  - the sensor system comprises a far infrared (FIR) sensing system configurable to identify the object when the vehicle is in the standby mode;
  - automatically providing the user notification comprises automatically pushing the user notification to the output interface;
  - identifying the object comprises receiving an estimated distance to the detected object and an estimated angle of the object in relation to a forward line of sight of the vehicle; and
  - determining the estimated geographic location of the object comprises calculating the estimated geographic location based at least in part on the estimated distance from the current geographic location of the vehicle in the estimated angle of the object in relation to the forward line of sight of the vehicle.

16. The vehicle of claim 15, wherein the output interface comprises a telematics system to transmit the user notification to an electronic device over a network, wherein the electronic device is configured to display the navigational map.

17. The vehicle of claim 15, further comprising a display device onboard the vehicle, wherein the output interface is coupled between the controller and the display device to provide the user notification to the display device, wherein the display device is configured to display the navigational map.

18. The vehicle of claim 15, wherein the standby mode indicates that the vehicle is in park with an ignition switch of the vehicle in an off position.

19. The vehicle of claim 15, wherein causing the driver seat to vibrate in response to the sensor system detecting the object comprises causing the driver seat of the vehicle to vibrate with sufficient force to awaken a sleeping driver in the driver seat.

20. The vehicle of claim 15, wherein the processor generates a graphical user interface (GUI) display comprising:
- the user notification comprising the navigational map of the region including the graphical indication of the detected object overlying the navigational map data at the estimated geographic location on the navigational map;
- a first selectable GUI element to save a recorded video stream of the navigational map;
- a second selectable GUI element to stop recording the video stream;
- a third selectable GUI element to disable the sensor system; and
- a fourth selectable GUI element to swap a viewpoint depicted in the navigational map.

* * * * *